(12) United States Patent
Sinha (10) Patent No.: US 10,042,324 B2
(45) Date of Patent: Aug. 7, 2018

(54) OPTICAL FINGERPRINT IMAGING USING HOLOGRAPHY

(71) Applicant: Synaptics Incorporated, San Jose, CA (US)

(72) Inventor: Supriyo Sinha, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 352 days.

(21) Appl. No.: 14/788,298

(22) Filed: Jun. 30, 2015

(65) Prior Publication Data
US 2017/0003649 A1 Jan. 5, 2017

(51) Int. Cl.
*G06K 9/00* (2006.01)
*G03H 1/00* (2006.01)
*G03H 1/08* (2006.01)
*G02B 27/14* (2006.01)
*G03H 1/04* (2006.01)

(52) U.S. Cl.
CPC ......... *G03H 1/0011* (2013.01); *G03H 1/0443* (2013.01); *G03H 1/0866* (2013.01); *G06K 9/00046* (2013.01); *G02B 27/14* (2013.01); *G02B 27/144* (2013.01); *G03H 2001/046* (2013.01); *G03H 2001/0456* (2013.01); *G03H 2222/33* (2013.01); *G03H 2222/34* (2013.01)

(58) Field of Classification Search
CPC .... G02B 27/14; G06T 5/001; G06K 9/00046; G03H 1/0866; G03H 1/0443; G03H 1/0011
See application file for complete search history.

(56) References Cited

U.S. PATENT DOCUMENTS

| | | | |
|---|---|---|---|
| 4,053,228 A | 10/1977 | Schiller | |
| 5,812,252 A * | 9/1998 | Bowker | F41A 17/066 250/227.11 |
| 6,175,407 B1 * | 1/2001 | Sartor | G06K 9/00046 250/227.11 |
| 6,822,734 B1 * | 11/2004 | Eidelman | G01N 21/8806 356/237.2 |
| 7,002,691 B2 * | 2/2006 | Thomas | G01B 9/021 356/457 |
| 7,261,418 B2 * | 8/2007 | Ma | G02B 27/1026 348/E9.027 |
| 7,317,814 B2 | 1/2008 | Kostrzewski et al. | |

(Continued)

OTHER PUBLICATIONS

Verrier, et al., "Off-Axis Digital Hologram Reconstruction: Some Practical Considerations," *Applied Optics*, vol. 50, Issue 34, pp. H136-H146 (2011).

*Primary Examiner* — Mia M Thomas
(74) *Attorney, Agent, or Firm* — Leydig, Voit & Mayer, LLP (57) ABSTRACT

Various systems for imaging are provided. An electronic device includes a biometric sensor and a processing system. The biometric sensor includes an illuminator, a mirror, a biometric sensor array and a beam splitter. The beam splitter splits a beam received from the illuminator into a first beam incident on a biometric sensing area and a second beam incident on the mirror. The beam splitter combines the reflected beams from the biometric sensing area and the mirror. Thereafter, the processing system receives data from the sensor array and reconstructs the biometric image.

22 Claims, 5 Drawing Sheets

(56) References Cited

U.S. PATENT DOCUMENTS

| | | | | |
|---|---|---|---|---|
| 7,365,858 B2* | 4/2008 | Fang-Yen | | G01N 21/45 356/489 |
| 7,532,176 B2* | 5/2009 | Imade | | H04N 9/3114 345/102 |
| 7,616,319 B1* | 11/2009 | Woollam | | G01J 3/02 356/369 |
| 8,325,400 B2* | 12/2012 | Chen | | G03H 1/0443 359/22 |
| 8,379,313 B2* | 2/2013 | Shimomura | | G02B 26/125 347/239 |
| 8,873,596 B2* | 10/2014 | Dribinski | | G02F 1/37 372/18 |
| 8,913,800 B2* | 12/2014 | Rowe | | G06K 9/00046 382/124 |
| 8,937,759 B2* | 1/2015 | Holmes | | G02B 5/32 359/279 |
| 9,207,638 B2* | 12/2015 | Dubois | | G02B 21/00 |
| 9,406,166 B2* | 8/2016 | Futterer | | G02B 5/32 |
| 9,632,039 B2* | 4/2017 | Den Boef | | G01B 11/00 |
| 9,768,577 B2* | 9/2017 | Chuang | | H01S 3/005 |
| 2003/0038248 A1* | 2/2003 | Maher | | G01N 21/253 250/458.1 |
| 2005/0247776 A1* | 11/2005 | Harper | | G07C 9/00087 235/380 |
| 2006/0002109 A1* | 1/2006 | Imade | | H04N 9/3114 362/231 |
| 2006/0103810 A1* | 5/2006 | Ma | | G02B 27/1026 353/20 |
| 2007/0053400 A1* | 3/2007 | Sinha | | H01S 3/06716 372/64 |
| 2007/0120691 A1* | 5/2007 | Braun | | B60K 28/063 340/576 |
| 2007/0200663 A1* | 8/2007 | White | | A61B 5/117 340/5.31 |
| 2008/0204736 A1* | 8/2008 | Chikamatsu | | G01N 21/9501 356/237.4 |
| 2008/0260214 A1* | 10/2008 | Hauke | | G06K 9/00033 382/124 |
| 2010/0208952 A1 | 8/2010 | Wu | | |
| 2010/0265496 A1* | 10/2010 | Nakano | | G01N 21/94 356/237.5 |
| 2010/0328780 A1* | 12/2010 | Tocci | | G02B 5/04 359/636 |
| 2011/0249692 A1* | 10/2011 | Honea | | G02B 6/02347 372/29.011 |
| 2012/0193522 A1* | 8/2012 | Yan | | G02B 6/4204 250/227.28 |
| 2012/0257033 A1* | 10/2012 | Rowe | | G06K 9/00046 348/77 |
| 2012/0261559 A1* | 10/2012 | Yan | | G02B 6/4214 250/227.28 |
| 2013/0070320 A1* | 3/2013 | Holmes | | G02B 5/32 359/9 |
| 2013/0128273 A1* | 5/2013 | Inoue | | G02B 5/04 356/450 |
| 2015/0205260 A1* | 7/2015 | Awatsuji | | G03H 1/0866 348/40 |
| 2016/0334652 A1* | 11/2016 | Sakuma | | H01S 3/2391 |

* cited by examiner

OPTICAL FINGERPRINT IMAGING USING HOLOGRAPHY

FIELD OF THE DISCLOSURE

This disclosure generally relates to image sensors and more particularly to biometric sensors, such as fingerprint sensors.

BACKGROUND

Biometric authentication systems are used for authenticating users of devices incorporating the authentication systems. Biometric sensing technology provides a reliable, non-intrusive way to verify individual identity for authentication purposes.

Fingerprints, like certain other biometric characteristics, are based on unalterable personal characteristics and thus are a reliable mechanism to recognize individuals. There are many potential applications for utilization of biometric and fingerprint sensors. For example, fingerprint sensors may be used to provide access control in stationary applications, such as security checkpoints. Fingerprint sensors may also be used to provide access control in portable applications, such as portable computers, personal data assistants (PDAs), cell phones, gaming devices, navigation devices, information appliances, data storage devices, and the like. Accordingly, some applications, in particular portable applications, may require electronic fingerprint sensing systems that are compact, highly reliable, and inexpensive.

The higher the resolution of the biometric authentication system, the more detailed information it can obtain from the user. For example, a higher resolution fingerprint sensor obtains more detailed information from a user's fingerprint than a lower resolution fingerprint sensor. Higher detail fingerprint information allows for a more reliable mechanism to recognize individuals.

Many biometric sensors are capacitive. However, capacitive sensors have difficulty achieving resolutions higher than about 500 pixels per inch. Additionally, capacitive sensors have difficulty sensing through thick layers of material, as increasing the distance from the capacitive sensing elements tends to decrease signal strength and increase blurring between individual pixels. A higher resolution sensor that can more efficiently sense through thick layers of material is desired.

BRIEF SUMMARY

One embodiment provides an electronic device. The electronic device includes a biometric sensor. The biometric sensor includes an illuminator, a mirror, a biometric sensor array and a beam splitter. The beam splitter is configured to split a beam received from the illuminator into a first beam incident on a biometric sensing area and a second beam incident on the mirror. The beam splitter is further configured to combine a reflected first beam reflected from the biometric sensing area and a reflected second beam reflected from the mirror into a third beam incident on the sensor array. The reflected first beam and the reflected second beam are combined off-axis with respect to each other in the third beam.

A processing system is coupled to the sensor array. The processing system is configured to transform pixel data from the sensor array into a frequency spectrum. The frequency spectrum includes a zeroth order image, a real image, and a virtual image. The processing system is further configured to filter the frequency spectrum outside of a frequency range corresponding to the real image and reconstruct the filtered frequency spectrum into a biometric image.

In another embodiment, a biometric sensor is provided. The biometric sensor includes an illuminator, a mirror, a biometric sensor array and a beam splitter. The beam splitter is configured to split a beam received from the illuminator into a first beam incident on a biometric sensing area and a second beam incident on the mirror. The beam splitter is further configured to combine a reflected first beam reflected from the biometric sensing area and a reflected second beam reflected from the mirror into a third beam incident on the sensor array, wherein the reflected first beam and the reflected second beam are combined off-axis with respect to each other in the third beam. A processing system is coupled to the sensor array. The processing system configured to reconstruct a biometric image.

In yet another embodiment, an electronic device is provided. The electronic device includes a biometric sensor. The biometric sensor includes a plurality of illuminators, a mirror, a biometric sensor array and a plurality of beam splitters. Each beam splitter is configured to split a beam received from one of the plurality of illuminators into a first beam incident on a biometric sensing area and a second beam incident on the mirror. Each beam splitter is further configured to combine a reflected first beam reflected from the biometric sensing area and a reflected second beam reflected from the mirror into a third beam incident on the sensor array. The reflected first beam and the reflected second beam are combined off-axis with respect to each other in the third beam.

A processing system is coupled to the sensor array. For each of the plurality of beam splitters, the processing system is configured to transform pixel data from the sensor array into a frequency spectrum. The frequency spectrum includes a zeroth order image, a real image, and a virtual image. The processing system to further configured to filter the frequency spectrum outside of a frequency range corresponding to the real image and reconstruct the filtered frequency spectrum into a biometric image. The processing system combines each of the biometric images from each of the beam splitters into a single combined biometric image.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

This disclosure relates generally to methods and systems for imaging. Embodiments of the disclosed system are capable of high resolution object imaging. In some embodiments, the system achieves high resolution imaging by using a holographic imaging sensor. The holographic imaging sensor uses a beam splitter to split light emitted from a light source into two directions. A portion (e.g., first beam) of the light is reflected in a first direction to the object to be imaged and a portion (e.g., second beam) of the light to transmitted in a second direction to a mirror. The light reflected from the mirror and reflected from the object to be imaged are then combined at the beam splitter forming combined reflected light. The combined reflected light is then incident on a sensor.

In one embodiment, a processing system is configured to reconstruct pixel data from the sensor into an image of the object using a Fresnel integral. In another embodiment, a Fresnel-Kirchhoff integral is used. In either case, multiple images are created. A zeroth order image and twin images that form from the virtual image and real image and some parasitic images are all created. The processor then filters the multiple images so that only the real image remains.

In accordance with this disclosure, the system and method can be used to image any object. As explained in more detail below, in certain embodiments a biometric object, such as a fingerprint is imaged. By using a holographic imaging sensor, a high level of detail can be obtained. For example, in some embodiments fine details such as sweat pores in a fingerprint can be imaged. In some embodiments, imaging fine details increases the security of biometric security systems, such as a fingerprint reader, by for example allowing the use of fine features to verify the liveness of a biometric object, allowing for a higher quality image that improves matching accuracy, or allowing for the use of additional discriminative features for matching.

The described systems, methods and sensors can be incorporated into various electronic systems. Some non-limiting examples of electronic systems include personal computers of all sizes and shapes, such as desktop computers, laptop computers, netbook computers, tablets, web browsers, e-book readers, and personal digital assistants (PDAs). Additional exemplary electronic devices include composite input devices, such as physical keyboards and separate joysticks or key switches. Further examples include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras).

Figure 1:
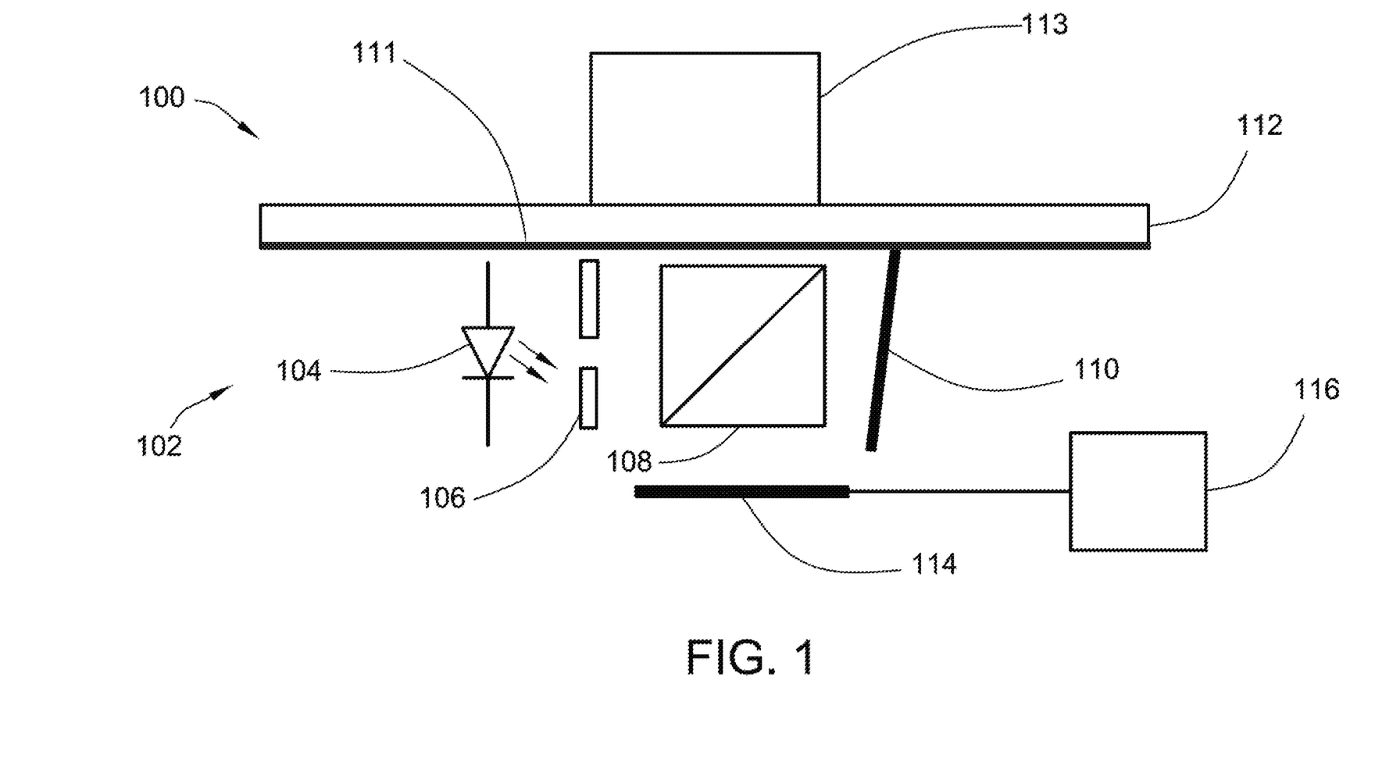
FIG. 1 is a block diagram of an exemplary system of a holographic optical sensor, in accordance with an embodiment of the disclosure.

Turning now to the figures, FIG. 1 is generally a block diagram of a biometric sensor in accordance with the disclosure. Specifically, the illustrated biometric sensor is a holographic optical sensor 100. In one embodiment, the holographic optical sensor 100 is a fingerprint sensor. The holographic optical sensor 100 includes an illuminator 102. The illuminator 102 includes a light source, such as a light emitting diode 104 (LED) and a pinhole 106. In alternative embodiments, light sources include organic light-emitting diodes (OLED) and laser diodes. In other embodiments, the illuminator includes a narrow band light source. In another embodiment, the illuminator includes a light source and a spectral filter which passes a narrow band of light.

The holographic optical sensor 100 also includes a beam splitter 108 and an angled mirror 110. The object 113 to be imaged, such a finger, is placed in a sensing area 111. In some embodiments, a protective layer 112, such as a cover lens, covers the sensing area 111. The cover lens may cover a display, such as a LCD display, AMOLED display, OLED display or other display. In some embodiments, the display is part of a mobile device, such as a cellular telephone. A sensor 114, such as a complementary metal-oxide-semiconductor (CMOS) sensor, gathers light to image the object. Alternative sensors, such as a charge-coupled device (CCD) camera can also be used. In one embodiment, the protective layer 112 is disposed over the beam splitter 108. The upper surface of the protective layer 112 corresponds to the biometric sensing area. The protective layer 112 may be a cover lens of a display. In one embodiment, the beam splitter 108 is mounted to a lower surface of the protective layer. In the illustrated embodiment, the mirror 110 is a discrete mirror. In alternative embodiments, the mirror is coated on a face of the beam splitter. In some embodiments, the illuminator 102 and the mirror 110 are disposed on opposite sides of the beam splitter 108 in a relatively horizontal direction, and the sensing area 111 and the sensor array 114 are disposed on opposite sides of the beam splitter 108 in a relatively vertical direction.

As FIG. 1 illustrates, light emitted by the light source 104 is filtered through the pinhole 106. The pinhole is typically a few microns in diameter. As shown, the pinhole 106 is disposed in an optical path between the light source 104 and the beam splitter 108. The light through the pinhole 106 results in a beam that is incident on the beam splitter 108. In some embodiments with a sufficiently small light source, a pin hole is not necessary. The beam splitter splits the light into first and second beams. The first beam is reflected towards the cover lens 112 and the object 113 to be imaged, such as a finger. The second light beam is transmitted through the beam splitter and is sent to the mirror 110. The mirror 110 is angled such that the light is not at normal incidence.

The light from the first beam is reflected from the object 113 to be imaged and sent back towards the beam splitter. Light from the second beam is reflected at the mirror 110 and is also sent back towards the beam splitter. However, because the mirror 110 is angled, the light from the second beam is reflected at an angle. The first and second beams are combined at the beam splitter 108 and the interference is measured at the sensor 114.

A processing system 116 may be coupled to the sensor 114 for processing the measured interference. The processing system may include a processor and a non-transitory computer readable memory. The processing system 116 is configured to transform pixel data from the sensor array 114 into frequency spectrum data. As detailed below, the frequency spectrum data includes a zeroth order image, a real image and a virtual image. The processing system 116 can include various components such as a processor(s), a memory, a template storage, an operating system (OS), and a power source(s). Each of the processor(s), the memory, the template storage, the operating system and power source are interconnected physically, communicatively, and/or operatively for inter-component communications. The processor may execute instructions stored in memory or instructions stored on template storage to determine whether an authentication attempt in a security system is successful or unsuccessful. The memory, which may be a non-transient, computer-readable storage medium, is configured to store information within the electronic device during operation. In some embodiments, the memory includes a temporary memory, an area for information not to be maintained when the electronic device is turned off. Examples of such temporary memory include volatile memories such as random access memories (RAM), dynamic random access memories (DRAM), and static random access memories (SRAM). The memory also maintains program instructions for execution by the processor.

The processing system 116 filters the frequency spectrum outside of a frequency range corresponding to the real image. For example, the processing system may use high pass, low pass or other filters to filter the frequency spectrum outside of the frequency range corresponding to the real image. In one embodiment, the object 113 is a biometric object, such as a fingerprint. The processing system 116 reconstructs the filtered frequency spectrum into a biometric image. In one embodiment, the processing system 116 is configured to reconstruct the pixel data into the biometric image using a Fresnel integral. In another embodiment, the processing system 116 is configured to reconstruct the pixel data into the biometric image using a Fresnel-Kirchhoff integral. The processor may store instructions on a non-transitory computer-readable memory for reconstructing the pixel data.

In the embodiment illustrated in FIG. 1, the beam splitter 108 splits the light received from the illuminator 102 by transmitting light to the mirror 110 and reflecting light to the sensing area 111. Thus, the beam splitter 108 splits a beam received from the illuminator 102 into a first beam incident on a biometric sensing area 111 and a second beam incident on the mirror 110. In another embodiment (such as the embodiment shown in FIG. 2C), the beam splitter 108 transmits light to the biometric sensing area 111 while reflecting light to the mirror 110. The embodiment illustrated in FIG. 1 may have a smaller packaging size in a vertical dimension. This may make the embodiment illustrated in FIG. 1 more suitable for packaging into certain consumer electronic devices, such as a mobile device.

Figure 2A:
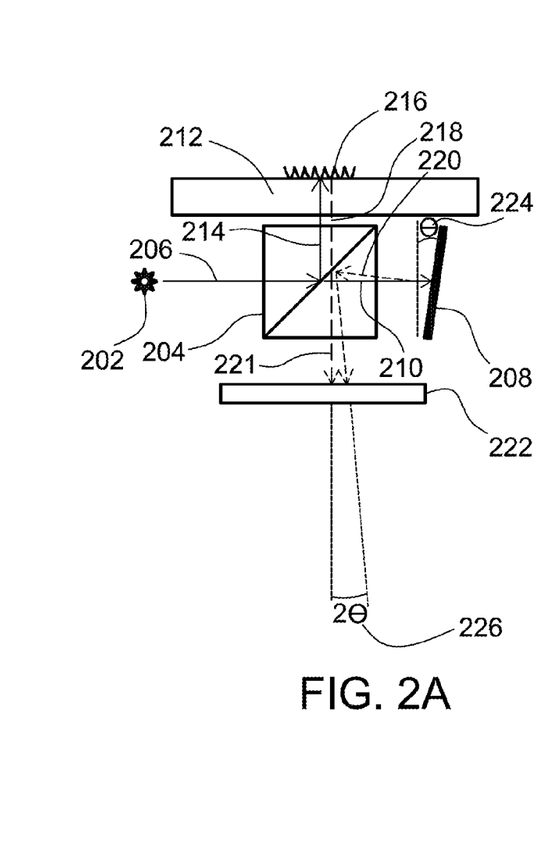
FIG. 2A is a block diagram of an exemplary system of a holographic optical sensor showing light transmission in the system, in accordance with an embodiment of the disclosure.
Figure 2B:
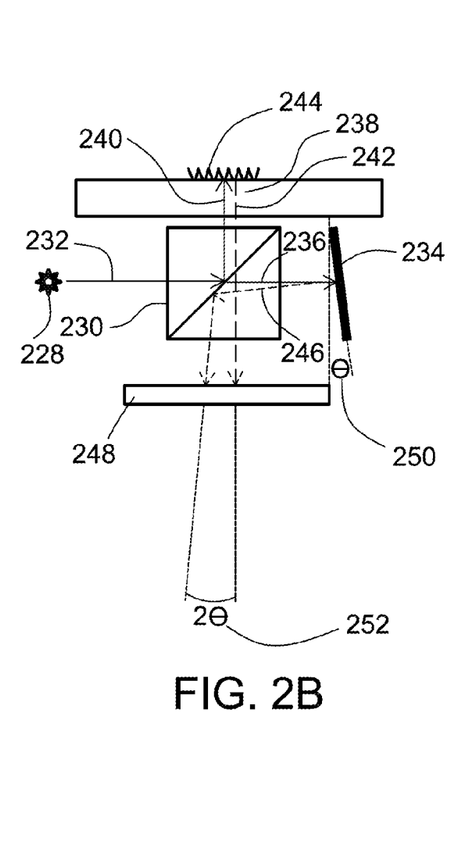
FIG. 2B is a block diagram of an exemplary system of a holographic optical sensor showing light transmission in the system, in accordance with another embodiment of the disclosure.
Figure 2C:
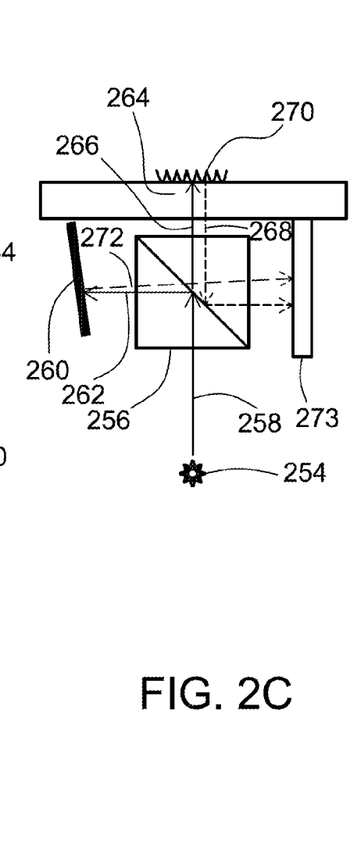
FIG. 2C is a block diagram of an exemplary system of a holographic optical sensor showing light transmission in the system, in accordance with yet another embodiment of the disclosure.

FIGS. 2A-2C show exemplary holographic optical sensor configurations and the light transmission in each system. In FIG. 2A, the illuminator 202 (including the light source and pinhole), sends light to the beam splitter 204. A portion of the light 206 incident on the beam splitter 204 is transmitted to the mirror 208 via path 210. A portion of the light 206 incident on the beam splitter 204 is reflected to the sensing area 212 via path 214.

The light reflected 218 from the object 216 and the light reflected 220 from the mirror 208 is combined at the beam splitter 204 and the interference is measured at the sensor 222. Thus, the beam splitter 204 combines a reflected first beam 218 reflected from the biometric sensing area 212 and a reflected second beam reflected 220 from the mirror 208 into a third beam 221 incident on the sensor array, wherein the reflected first beam 218 and the reflected second beam 220 are combined off-axis with respect to each other in the third beam 221. Angle 224 is the angle of the mirror. By angling the mirror 208, the resulting light reflected from the mirror and reflected from the object 216 and combined into the third beam 221 can be separated in frequency space as shown by angle 226. The separation of the images in frequency space will be explained further below.

In the embodiments illustrated in FIG. 2A-2C, the mirror angle 224 should be carefully chosen. The angle should be sufficient to allow the different components of the image to be separated in frequency space. Further, the angle should be small enough such that the pixel pitch can resolve the spatial frequency components. For the latter condition, the angle should be less than $Sin^{-1}(\lambda/2p)$ where p is the pixel pitch of the sensor and $\lambda$ is the frequency of light. Thus, the sensor array has a pixel pitch and the illuminator is configured to emit light of a first wavelength. In this embodiment, a relative angle between the face of the mirror and the normal of the sensing plane is less than the inverse sine of the first wavelength divided by the twice the pixel pitch.

FIG. 2B illustrates an alternative embodiment with a different mirror angle. The illuminator 228 sends light to the beam splitter 230. A portion of the light 232 incident on the beam splitter 230 is transmitted to the mirror 234 via path 236. A portion of the light 232 incident on the beam splitter 230 is reflected to the sensing area 238 via path 240. The light reflected 242 from the object 244 and the light reflected 246 from the mirror 234 are combined at the beam splitter 230 and the interference is measured at the sensor 248. The resulting light reflected from the mirror 234 and reflected from the object 244 can be separated in frequency space as shown by angle 252. Angle 250 is the angle of the mirror. As can been seen, angle 224 (FIG. 2A) and angle 250 are disposed in opposite directions.

FIG. 2C illustrates another alternative embodiment with a different configuration. The illuminator 254 sends light to the beam splitter 256. A portion of the light 258 incident on the beam splitter 256 is reflected to the mirror 260 via path 262. A portion of the light 258 incident on the beam splitter 256 is transmitted to the sensing area 264 via path 266. The light reflected 268 from the object 270 and the light reflected 272 from the mirror 260 are combined at the beam splitter 256 and the interference is measured at the sensor 272. The resulting light reflected from the mirror 273 and reflected from the object 268 can be separated in frequency space as described in more detail below.

Figure 3:
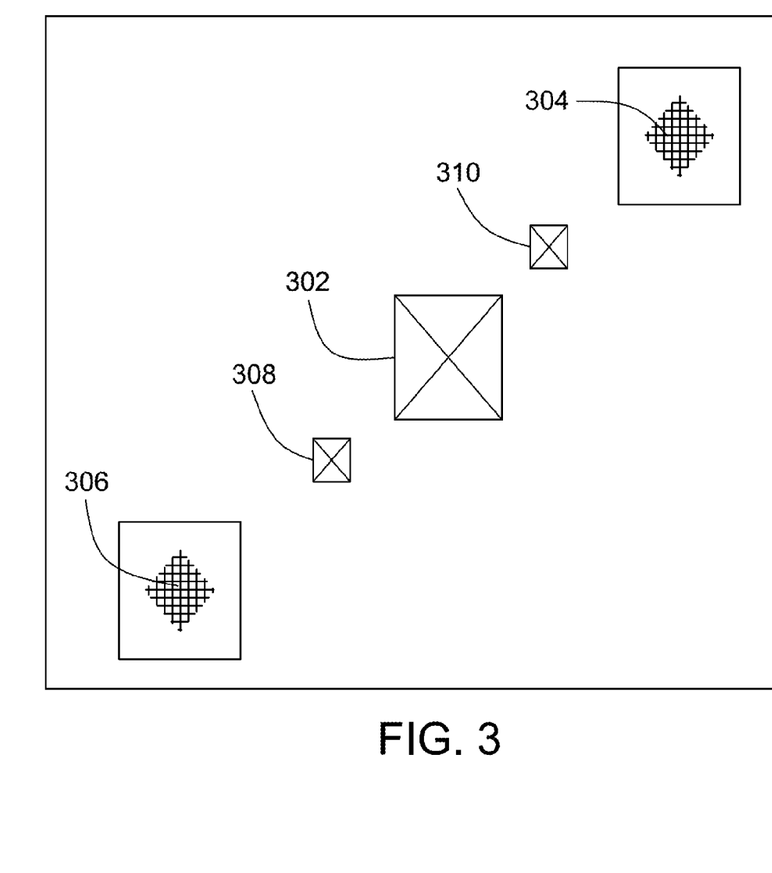
FIG. 3 shows the Fourier transformation of an image captured by a sensor in accordance with various embodiments of the disclosure, such as the embodiment shown in FIG. 1.

FIG. 3 shows the Fourier transformation of an image captured by a sensor in accordance with various embodiments of the disclosure, such as the embodiment shown in FIG. 1. There are three main components of the image that is formed in the sensor, such as sensor 114 in FIG. 1. First, there is the zeroth order image 302, which is the sum of the individual images of the object to be imaged 113 and from the angled mirror 110. Second, there are twin images that form from the virtual image 304 and real image 306 of the interference between the object to be imaged 113 and the angled mirror 110. In addition, there will be some parasitic images 308, 310 resulting from unwanted reflections. The parasitic images 308, 310 could be minimized by applying an appropriate anti-reflection coating to the optics. If the mirror 110 were parallel to the beam splitter (i.e., perpendicular to the cover glass 112), the images would be difficult to separate. However, by angling the mirror, the images are separated in frequency space. The system should filter out all frequencies except those representing the real image.

Once the frequency spectrum is filtered so that only the real image frequencies remain, the image can be reconstructed using the Fresnel-Kirchhoff integral or the Fresnel integral.

In some embodiments, the diameter of the pinhole should be chosen such that the illumination numerical aperture (NA) matches the detection NA. The collected light should cover as much of the sensor 114 as possible and the sensor pixel size should be chosen such that it doesn't limit the resolution. The distance between the pinhole 106 and beam splitter 108 should be minimized, as should the distance between the beam splitter 108 and mirror 110 and the beam splitter 108 and the object to be imaged 113.

Figure 4:
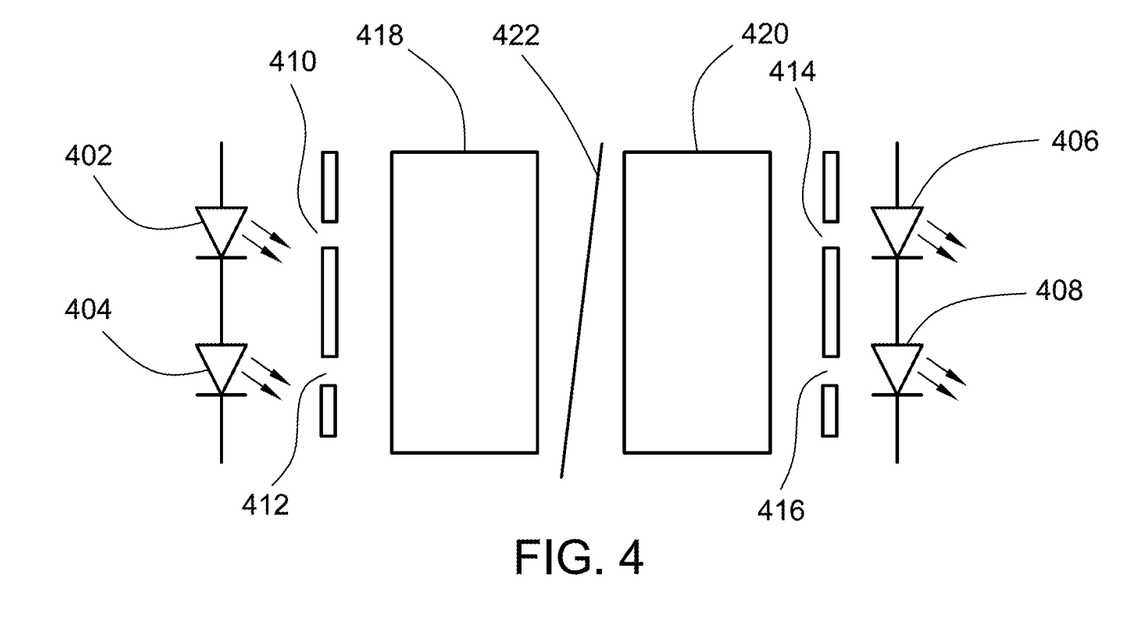
FIG. 4 is a top view of a block diagram of an exemplary system of a holographic optical sensor for quadrupling an image, in accordance with another embodiment of the disclosure.

FIG. 4 is a top view of a block diagram of an exemplary system of a holographic optical sensor for quadrupling an image, in accordance with another embodiment of the disclosure. While the illustrated system has two beam splitters and four illuminators, the principle works with other numbers of beam splitters and illuminators.

Four illuminators 402, 404, 406, 408 provide light through corresponding pinholes 410, 412, 414, 416. Two beam splitters 418, 420 transmit a portion of the light from the illuminators 402, 404, 406, 408 towards the mirror 422. A portion of the light is reflected towards the object to be imaged (not shown in the top view figure). Each of the beam splitters is configured to split a beam received from a corresponding illuminator into a first beam incident on the biometric sensing area and a second beam incident on a corresponding mirror. This system is shown in FIG. 1 for one beam splitter in a side view. The same principle applies to multiple beam splitter configurations. As explained above for one beam splitter, the beam splitters 418, 420 combine a reflected first beam reflected from the biometric sensing area and a reflected second beam reflected from the corresponding mirror into a third beam incident on the sensor array. The reflected first beam and the reflected second beam are combined off-axis with respect to each other in the third beam. In the illustrated embodiment, the mirror 422 is disposed between each of the beam splitters 418, 420 and each of the beam splitters 418, 420 shares the mirror 422.

The embodiment shown in FIG. 4 produces four images. Each image can be processed using a Fourier transform as described above with reference to FIG. 3. The processing system (e.g., 116, FIG. 1), is coupled to the sensor array (e.g., 114, FIG. 1). Each of the four images can be stitched together, or combined, to increase the imaged area by a factor of four. In order to decrease interference between each of the images, the illuminators 402, 404, 406, 408 can be pulsed, such that only one is on at any time. Alternatively, two could be pulsed followed by the remaining two illuminators. In another embodiment, the illuminators can be pulsed at different illumination frequencies. The processing system can be configured to filter out background noise based on a differential between the pixel data captured during the pulsed and non-pulsed periods. In another embodiment, different color illuminators are used and the processing system can be configured to filter out background noise based on a differential between the various colors used for the illuminators. Thus different respective illuminators corresponding to different respective beam splitters can be spectrally coded (with different illumination wavelengths) in order to decode the image at the detector array.

Figure 5:
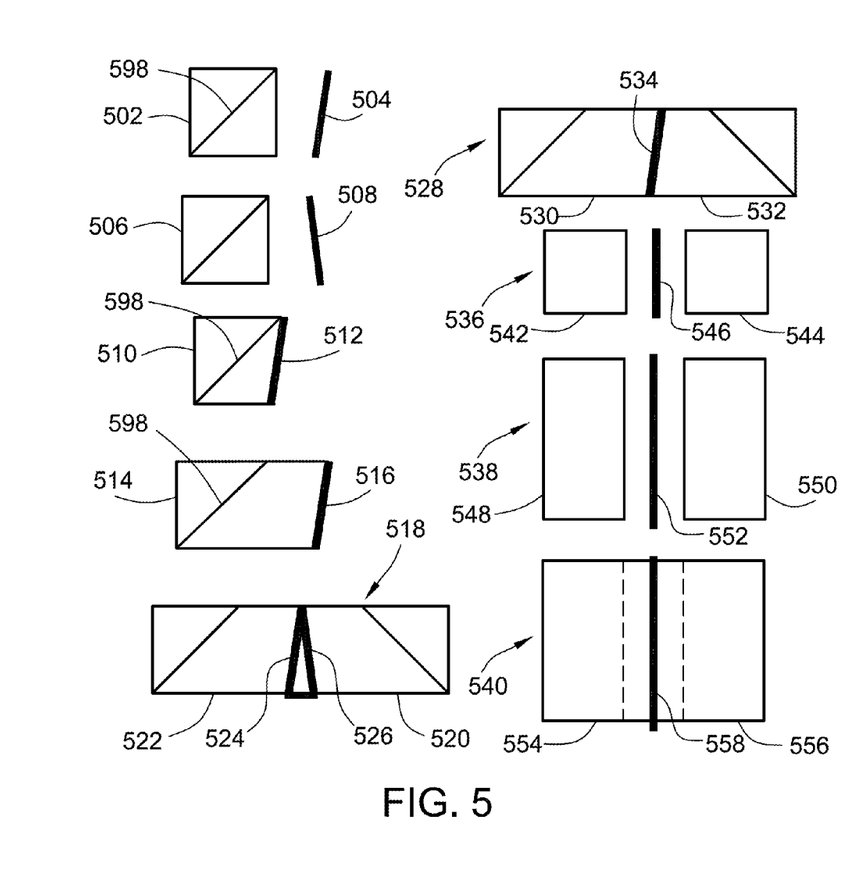
FIG. 5 shows various beam splitter configurations in accordance with embodiments of the disclosure.

FIG. 5 illustrates various beam splitter configurations and mirrors, which can be used, for example, to limit the overall size of the sensor and/or increase the area to be imaged. While the embodiments described include cube beam splitters, other types of beam splitters can also be used. For example, plate beam splitters, cube beam splitters, polarized and non-polarized beam splitters can be used depending on the application. In some embodiments, the thickness of a beam splitter is determined by the length of the angled mirror. Beam splitter configurations 502, 506, 510 and 514 (front view illustrated) contain a single beam splitter and mirrors 504, 508, 512 and 516. In each of these configurations, the length of the mirror determines the thinness of the beam splitter. These configurations can be used in numerous embodiments, including, for example, the embodiment depicted in FIG. 1. Mirrors 512 and 516 are mounted on the beam splitters 510 and 514. The mirror can also be coated on the face of the beam splitter. In some embodiments, a polarizing beam splitter is used. For example, in one embodiment, a polarizing beam splitter is used, with a first quarter wave plate disposed between the sensing surface and the polarizing beam splitter, and a second quarter wave plate disposed between the mirror and the polarizing beam splitter. This embodiment may better preserve light from the illuminator compared to certain embodiments that use a non-polarizing beam splitter. Further, a polarizing beam splitter does not absorb and dissipate the energy of the rejected polarization state, and so they may be suitable for use with high intensity light sources, such as lasers.

In some embodiments, the distance of the beam splitter reflective layer 598 from the mirror and the object to be imaged should be the same. Therefore, as shown in beam splitter 514, the distance from the beam splitter reflective layer 598 to the coated mirror 516 is elongated to match the distance from the beam splitter reflective layer to the sensing area.

Beam splitter configuration 518 (front view illustrated) contain two beam splitters 520, 522 and two mirrors 524, 526. This configuration can be used in embodiments using multiple images, such as the embodiment shown in FIG. 4. Beam splitter configuration 528 also includes two beam splitters 530, 532 that share one two-sided mirror 534. In these configurations, multiple beam splitters allows the imaging area of the sensor to be increased without increasing the thickness of the beam splitter, as would result if an equivalent area were captured using a single beam splitter.

Beam splitter configurations 536, 538 and 540 (top view illustrated) each contain two beam splitters and one mirror. Beam splitter configuration 536 contains beam splitters 542, 544 and mirror 546. Likewise, beam splitter configuration 538 contains beam splitters 548, 550 and mirror 552. Beam splitter configuration 540 contains beam splitters 554, 556 and mirror 558. Mirror 558 may be coated to beam splitters 554 and 556 or may be a separate mirror sandwiched between the beam splitters. Beam splitter configurations 536, 538 and 540 can be used in embodiments using multiple images, such as the embodiment shown in FIG. 4.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electronic device comprising:
    a biometric sensor, the biometric sensor comprising:
        an illuminator;
        a mirror;
        a biometric sensor array; and
        a beam splitter, the beam splitter configured to:
            split a beam received from the illuminator into a first beam incident on a biometric sensing area and a second beam incident on the mirror; and
            combine a reflected first beam reflected from the biometric sensing area and a reflected second beam reflected from the mirror into a third beam incident on the sensor array, wherein the reflected first beam and the reflected second beam are combined off-axis with respect to each other in the third beam;
    a processing system coupled to the sensor array, the processing system configured to:
        transform pixel data from the sensor array into a frequency spectrum, the frequency spectrum including a zeroth order image, a real image, and a virtual image;
        filter the frequency spectrum outside of a frequency range corresponding to the real image; and
        reconstruct the filtered frequency spectrum into a biometric image.

2. The electronic device of claim 1, wherein the biometric sensor is a fingerprint sensor.

3. The electronic device of claim 1, further comprising a protective layer disposed over the beam splitter, wherein the biometric sensing area is at an upper surface of the protective layer.

4. The electronic device of claim 3, wherein the protective layer is a cover lens of a display.

5. The electronic device of claim 3, wherein the beam splitter is mounted to a surface of the protective layer.

6. A biometric sensor comprising:
    an illuminator;
    a mirror;
    a biometric sensor array; and
    a beam splitter, the beam splitter configured to:
        split a beam received from the illuminator into a first beam incident on a biometric sensing area and a second beam incident on the mirror; and
        combine a reflected first beam reflected from the biometric sensing area and a reflected second beam reflected from the mirror into a third beam incident on the sensor array, wherein the reflected first beam and the reflected second beam are combined off-axis with respect to each other in the third beam, and wherein the first beam is reflected by the beam splitter to the biometric sensing area and the second beam is transmitted by the beam splitter to the mirror.

7. The biometric sensor of claim 6, wherein the biometric sensor is a fingerprint sensor.

8. The biometric sensor of claim 6, further comprising a protective layer disposed over the beam splitter, wherein the biometric sensing area is at an upper surface of the protective layer.

9. The biometric sensor of claim 8, wherein the protective layer is a cover lens of a display.

10. The biometric sensor of claim 8, wherein the beam splitter is a polarizing beam splitter having a first quarter wave plate disposed between the biometric sensing area and the polarizing beam splitter, and a second quarter wave plate disposed between the mirror and the polarizing beam splitter.

11. The biometric sensor of claim 6, further comprising a second beam splitter, wherein each of the beam splitters is configured to split a beam received from a corresponding illuminator into a first beam incident on the biometric sensing area and a second beam incident on a corresponding mirror.

12. The biometric sensor of claim 11, wherein the mirror is disposed between each of the beam splitters, and each of the beam splitters share the mirror.

13. The biometric sensor of claim 6, wherein the mirror is a discrete mirror mounted proximate to the beam splitter.

14. The biometric sensor of claim 6, wherein the mirror is coated on a face of the beam splitter.

15. The biometric sensor of claim 6, wherein the illuminator comprises a light source and a pinhole, wherein the pinhole is disposed in an optical path between the light source and the beam splitter.

16. The biometric sensor of claim 6, wherein the sensor array has a pixel pitch, the illuminator is configured to emit light of a first wavelength, and wherein a relative angle between the face of the mirror and the normal of the sensing plane is less than the inverse sine of the first wavelength divided by the twice the pixel pitch.

17. An electronic device comprising:
    a biometric sensor, the biometric sensor comprising:
        a plurality of illuminators;
        a mirror;

a biometric sensor array; and
a plurality of beam splitters, each beam splitter configured to:
split a beam received from one of the plurality of illuminators into a first beam incident on a biometric sensing area and a second beam incident on the mirror; and
combine a reflected first beam reflected from the biometric sensing area and a reflected second beam reflected from the mirror into a third beam incident on the sensor array, wherein the reflected first beam and the reflected second beam are combined off-axis with respect to each other in the third beam;
a processing system coupled to the sensor array, for each of the plurality of beam splitters the processing system configured to:
transform pixel data from the sensor array into a frequency spectrum, the frequency spectrum including a zeroth order image, a real image, and a virtual image;
filter the frequency spectrum outside of a frequency range corresponding to the real image; and
reconstruct the filtered frequency spectrum into a biometric image; and
combine each of the biometric images from each of the beam splitters into a single combined biometric image.

18. The electronic device of claim 17, wherein the biometric sensor is a fingerprint sensor.

19. The electronic device of claim 17, further comprising a protective layer disposed over the beam splitter, wherein the biometric sensing area is at an upper surface of the protective layer.

20. A biometric sensor comprising:
an illuminator;
a mirror;
a biometric sensor array;
a beam splitter, the beam splitter configured to:
split a beam received from the illuminator into a first beam incident on a biometric sensing area and a second beam incident on the mirror; and
combine a reflected first beam reflected from the biometric sensing area and a reflected second beam reflected from the mirror into a third beam incident on the sensor array, wherein the reflected first beam and the reflected second beam are combined off-axis with respect to each other in the third beam; and
a protective layer disposed over the beam splitter, wherein the biometric sensing area is at an upper surface of the protective layer, and wherein the beam splitter is a polarizing beam splitter having a first quarter wave plate disposed between the biometric sensing area and the polarizing beam splitter, and a second quarter wave plate disposed between the mirror and the polarizing beam splitter.

21. A biometric sensor comprising:
an illuminator;
a mirror;
a biometric sensor array;
a first beam splitter, the first beam splitter configured to:
combine a reflected first beam reflected from the biometric sensing area and a reflected second beam reflected from the mirror into a third beam incident on the sensor array, wherein the reflected first beam and the reflected second beam are combined off-axis with respect to each other in the third beam; and
a second beam splitter, wherein each of the beam splitters is configured to split a beam received from a corresponding illuminator into a first beam incident on the biometric sensing area and a second beam incident on a corresponding mirror.

22. A biometric sensor comprising:
an illuminator;
a mirror;
a biometric sensor array; and
a beam splitter, the beam splitter configured to:
split a beam received from the illuminator into a first beam incident on a biometric sensing area and a second beam incident on the mirror; and
combine a reflected first beam reflected from the biometric sensing area and a reflected second beam reflected from the mirror into a third beam incident on the sensor array, wherein the reflected first beam and the reflected second beam are combined off-axis with respect to each other in the third beam, and
wherein the mirror is coated on a face of the beam splitter.

* * * * *